United States Patent
Bruce

(10) Patent No.: US 7,280,602 B1
(45) Date of Patent: Oct. 9, 2007

(54) MICROWAVE SIGNAL EDGE DETECTOR CIRCUIT FOR IMPROVED CLOCK RECOVERY

(75) Inventor: Robert Bruce, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 688 days.

(21) Appl. No.: 10/696,225

(22) Filed: Oct. 28, 2003

(51) Int. Cl.
*H04B 3/00* (2006.01)
*H04L 25/00* (2006.01)

(52) U.S. Cl. .................. 375/257; 375/354; 307/100; 333/33; 333/125

(58) Field of Classification Search ............... 375/257, 375/354, 259, 377; 307/100, 106; 385/100, 385/129; 333/22 R, 124, 125, 32–35
See application file for complete search history.

(56) References Cited

U.S. PATENT DOCUMENTS

| | | | |
|---|---|---|---|
| 4,561,091 A | 12/1985 | Scholl et al. ................. 370/85 |
| 5,686,872 A * | 11/1997 | Fried et al. ................ 333/22 R |
| 6,118,350 A * | 9/2000 | Gupta et al. ............... 333/22 R |
| 6,127,897 A | 10/2000 | Sasaki .......................... 331/25 |
| 6,269,127 B1 | 7/2001 | Richards ..................... 375/282 |
| 6,389,090 B2 | 5/2002 | Zortea et al. ................ 375/374 |
| 6,594,416 B1 | 7/2003 | Sargent, IV et al. .......... 385/24 |
| 6,763,151 B1 * | 7/2004 | Bosso et al. .................... 385/3 |

* cited by examiner

*Primary Examiner*—Phuong Phu
(74) *Attorney, Agent, or Firm*—Aka Chan LLP

(57) ABSTRACT

A signal edge detector circuit is described for the detecting the signal transitions in a stream of microwave signals at a predetermined clock signal rate, particularly for OC-768 data streams. Selected transmission lines in the signal edge detector circuit reflect the signal transitions to terminate each signal transition at the output terminal of the detector circuit and to cancel out each other at a circuit node to prevent reflected transitions back to the input terminal of the detector circuit and to the transmission lines. With a squaring circuit at the output terminal of the detector circuit and a narrow-band filter at the output of the squaring circuit, the clock signals at the predetermined clock signal rate are recovered.

16 Claims, 4 Drawing Sheets

MICROWAVE SIGNAL EDGE DETECTOR CIRCUIT FOR IMPROVED CLOCK RECOVERY

BACKGROUND OF THE INVENTION

The present invention is related to electrical circuits for recovering clock signals from a stream of transmitted digital signals and, more particularly, to circuits for detecting the edges of high-frequency, i.e., microwave, digital signals.

In the transmission of digital signals, the recovery at the receiver of the transmitter clock signal from a stream of incoming signals is an important function. The clock signal is required for the correct marking of each signal and permits the proper determination of the signal.

Present day "wired" communications are transmitting signals at faster and faster signal rates and optical fibers are typically used to carry such high-speed signals. An emerging standard for signal transmission over an optical fiber is OC-768 (Optical Carrier level-768) by which 40 gigabits per second are transmitted over SONET (Synchronous Optical NETwork) networks. The electrical signals resulting from these optical signals are at microwave frequencies which often induce resonances in the receiving circuit. Such resonances introduce undesired jitter and noise into electrical circuits, including circuits for recovering the clock signal from the transmitted signals.

There is, therefore, a need for clock signal recovery circuits which can operate effectively on high-frequency signals in emerging OC-768 systems.

SUMMARY OF THE INVENTION

The present invention provides for a signal edge detector circuit having an output terminal and an input terminal for receiving microwave signals at a predetermined clock signal rate. The signal edge detector circuit has an input transmission line connected to the input and output terminals to provide a path for signal transitions from the input terminal to the output terminal. The input transmission line includes a node between the input and output terminals. At the node one end of a first reflection transmission line to provide a reflection of the signal transition, the reflection of a polarity to terminate the signal transition at the output terminal. Also connected to the node is at least one second reflection transmission line to provide a reflection of the signal transition with a polarity to cancel out the reflection from the first reflection transmission line at the node. A pulse is generated at the output terminal for each leading pulse edge of said microwave signals at the input terminal.

With a squaring circuit and a narrow-band filter, the output of the signal edge detector circuit generates clock signals at the predetermined clock signal rate, such as the clock signal rate for OC-768 data signals.

DESCRIPTION OF SPECIFIC EMBODIMENTS

The present invention is directed toward a circuit which detects the edges of high-speed, i.e., microwave, signals by generating a pulse at each data transition. In particular, the circuit is designed for signals corresponding to a 40 megabit per second data stream generated in OC-768 systems. For a positive signal transition, the circuit generates a positive pulse; for a negative transition, a negative pulse is generated. To recover the clock signal in the data stream, a squaring (mixer) circuit at the output of the edge detector circuit inverts the negative pulses to positive and a pulse train is produced which is synchronous with the data edges. When the pulse train is processed by a narrow-band filter, the pulse train yields the desired clock signal.

With high frequency signals, unwanted jitter is introduced by the resonances in the receiving circuit. Such resonances are hard to avoid in microwave circuits. Depending upon the time constants of the components of the circuit, signals which had been previously received leave the circuit with a residue of prior random data bits. At the edge of the current data signal this contributes a random voltage which alters the signal transition and causes jitter. With the present invention, the receiving circuit reduces jitter in the recovered clock signal while maintaining a high energy transfer of the received signal from the input to the output terminals of the circuit.

Figure 1:
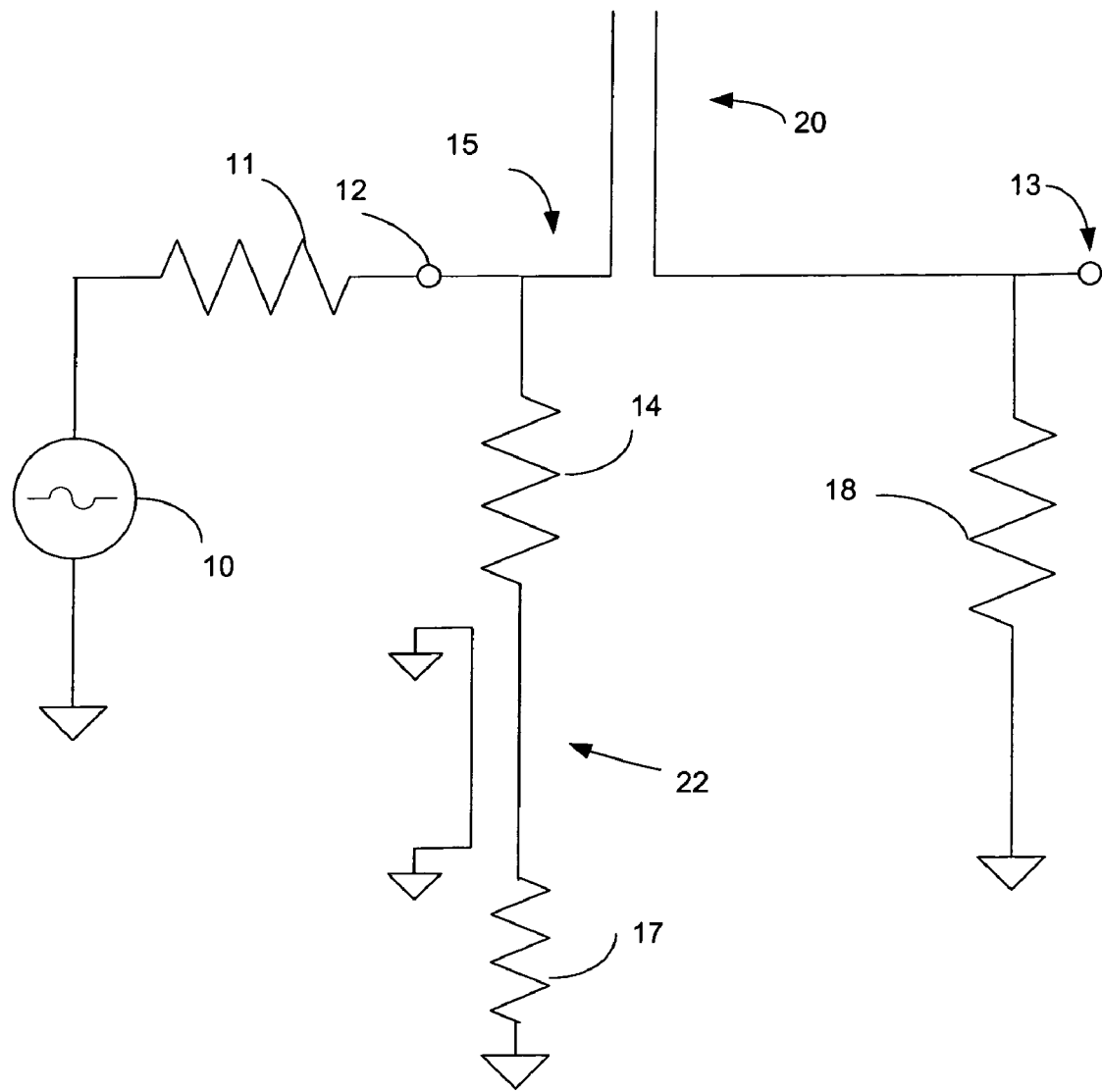
FIG. 1 is a circuit diagram of a signal edge detector circuit according to one embodiment of the present invention.

A representative embodiment of the present invention which illustrates its operation is shown in FIG. 1. The input signal and its source impedance are represented by a voltage source 10 and impedance 11 which are connected to an input terminal 12, the terminus of an input transmission line represented by a node 15. There are two other transmission lines 20, 22 connected to the node 15. One transmission line 20 is in series with an output terminal 13 and the load represented by a resistance 18. The other transmission line 22 is in parallel and is connected to the node 15 through the resistance 14. The transmission line 20 is ungrounded and terminated by an open circuit and the transmission line 22 is terminated by a resistor 17. As will become evident below, this arrangement provides input resistance/impedance matching.

The conductive leads of the circuit are described as transmission lines and resistor refers not necessarily to a particular element but often to a characteristic resistance/impedance of a transmission line due to the high frequency nature of the signals. In such cases it is best to treat a circuit as a system of distributed elements. This is particularly the case for microwave circuits.

Generally described, a pulse edge or signal transition arriving from the source 10 to the node 15 is split between the two transmission lines 20, 22. Since the transmission line 20 is in series with the load, part of the signal appears at the output terminal 13. The reflections from the two transmission lines 20, 22 return to cancel each other at the node 15 and to terminate the output signal at the output terminal 13. The result is the generation of a pulse at each transition of the incoming signal.

In a more detailed description, an incoming positive edge signal is split at the node 15, one part into the series transmission line 20, a second into the output terminal 13 and a third into the parallel transmission line 22. The signal in the transmission line 20 is subsequently reflected from the open circuit termination on that line and returns to the node 15 and the terminal 13 in a polarity sense to drive the node 15 positive and the output terminal 13 negative. There is a time delay depending upon the length of transmission line 20 so that the output terminal 13, after being driven positive by the initial edge, is driven back to zero.

The signal in the transmission line 22 is inverted and reflected at its remote end by the resistor 17. Because this resistor is chosen to be less than the characteristic impedance of transmission line 22, the reflection is inverted. It returns to the node 15 driving it negatively, and thus cancels the reflection returning on the transmission line 20, so that there is no effect on the voltage at node 15.

For the circuit to operate as described above, the parameters of the circuit must be properly matched. In the equations below, the reference number of each circuit element is used as a subscript to identify the element. For input impedance matching in the long term, i.e., time intervals by which all transient responses have died away, the resistance of the input should equal the sum of the resistances of the two resistors on the parallel transmission line 22:

$$R_{11} = R_{14} + R_{17};$$

And for input impedance matching in the short term, i.e., time intervals during which signals are still traveling down the circuit transmission lines and have not yet returned to the node 15, the impedance of the input should equal that of the parallel combination of transmission line 20 plus the load 18 and the resistor 14 plus transmission line 22. I.e., $$R_{11} = (R_{14} + R_{22})(R_{18} + R_{20})/(R_{14} + R_{22} + R_{18} + R_{20});$$

where $R_{20}$ and $R_{22}$ are the impedances of the transmission line 20 and transmission line 22, respectively. Note that in the short term, where the signal pulse from the node 15 has not had the time to return to that node, the influence of the resistor 17 at the input terminal 12 cannot be seen and hence $R_{17}$ has been left out of the equation above.

Assuming that the signal source 10 generates a step of unit voltage at the node 15, the initial output L1 to the load resistor 18 (and at the output terminal 13) is:

$$L1 = R_{18}/(R_{18} + R_{20}).$$

In the transmission line 20 the forward step voltage, Sp, is:

$$Sp = R_{20}/(R_{18} + R_{20}).$$

And the reflected step voltage, Sm from the open circuit termination of that line is:

$$Sm = Sp.$$

The forward step voltage in transmission line 22 is:

$$Pp = R_{22}/(R_{22} + R_{14}),$$

and the reflected pulse is, $$Pm = Pp^* (R_{17} - R_{22})/(R_{17} + R_{22}).$$

For ease of algebraic manipulation, it is useful to define two resistances, R1 and R2:

$$R1 = R_{11}(R_{14} + R_{22})/(R_{11} + R_{14} + R_{22}); \text{ and}$$

$$R2 = R_{14} + [R_{11}(R_{18} + R_{20})/(R_{11} + R_{18} + R_{20})].$$

The reflections Sm and Pm recombine to produce a second step voltage, L2 to the load resistor 18, a step, Q back to the input terminal 12, and steps S and P back into transmission line 20 and transmission line 22 respectively. These are:

$$L2 = Sm \cdot \left( \frac{-2 \cdot R_{18}}{R_1 + R_{18} + R_{20}} \right) + Pm \cdot \left( \frac{2 \cdot R_{11} \cdot R_{18}}{(R_2 + R_{22})(R_{11} + R_{18} + R_{20})} \right)$$

$$Q = Sm \cdot \left( \frac{2 \cdot R_1}{R_1 + R_{18} + R_{20}} \right) + Pm \cdot \left( \frac{2 \cdot R_{11} \cdot (R_{18} + R_{20})}{(R_2 + R_{22})(R_{11} + R_{18} + R_{20})} \right)$$

$$P = Sm \cdot \left( \frac{2 \cdot R_1}{R_1 + R_{18} + R_{20}} \right) \cdot \left( \frac{R_{22}}{R_{14} + R_{22}} \right) + Pm \cdot \left( \frac{R_2 - R_{22}}{R_2 + R_{22}} \right)$$

$$S = Sm \cdot \left( \frac{R_1 + R_{18} - R_{20}}{R_1 + R_{18} + R_{20}} \right) + Pm \cdot \left( \frac{2 \cdot R_{11} \cdot R_{20}}{(R_2 + R_{22})(R_{11} + R_{18} + R_{20})} \right)$$

To make the signal behave as described above, the following requirements are set: L2=−L1 to terminate the initial pulse at the output terminal 13; and Q=0, P=0, and S=0 to cancel out the reflected pulses. With R1, R2, Sm, Pm, $R_{17}$ and $R_{14}$ substituted into the equation for Q and Q is required to be 0, then $$0 = (R_{11}^2 \cdot R_{20}) - (R_{22} \cdot R_{20}^2) + (R_{11}^2 \cdot R_{22}) - 2 \cdot (R_{11} * R_{22} * R_{18}) + (R_{22} R_{18}^2).$$

This can be solved for $R_{22}$ such that $$R_{22} = (R_{11}^2 \cdot R_{20})/(R_{20}^2 - R_{11}^2 + 2(R_{11} \cdot R_{18}) - R_{18}^2)$$

With the same substations in the equations above for P and S, and setting them to be 0 and substituting for $R_{22}$ from the equation immediately above, the result is $$0 = R_{18}^4 - R_{11} \cdot R_{18}^3 + 2 \cdot R_{18}^3 \cdot R_{20} - R_{11} \cdot R_{20} \cdot R_{18}^2 - 2 \cdot R_{18} \cdot R_{20} + R_{11} \cdot R_{20}^2 R_{18} + R_{11} \cdot R_{20}^3 - R_{20}^4.$$

This equation factors to:

$$0 = (R_{18} - R_{20}) \cdot (R_{18} + R_{20})^2 \cdot (R_{18} - R_{11} + R_{20}).$$

There are three choices to solve this equation, $R_{20} = R_{18}$, $R_{20} = -R_{18}$, and $R_{20} = R_{11} - R_{18}$. Only the first solution is useful since the other two solutions lead to a negative value for $R_{20}$ or an infinite value for $R_{22}$. If $R_{18} = R_{20}$, i.e., the load impedance matches the impedance of the series transmission line 20, the circuit is solved in terms of $R_{11}$ and $R_{18}$ with the results:

$$R_{22} = (R_{11} \cdot R_{18})/(2 - R_{18} - R_{11});$$

$$R_{14} = (R_{11} \cdot R_{18})/(2 \cdot R_{18} - R_{11}) = R_{22};$$

$$R_{17} = R_{11} \cdot (R_{18} - R_{11})/(2 \cdot R_{18} - R_{11});$$

$$R1 = (2 \cdot R_{11} \cdot R_{18})/(4 \cdot R_{18} - R_{11});$$

$$R2 = R_{11} \cdot R_{18} \cdot (6 \cdot R_{18} - R_{11})/(4 \cdot R_{18}^2 - R_{11}^2);$$

$$Pm = -R_{11}/2 \cdot (2 \cdot R_{18} - R_{11});$$

$$Sm = 1/2.$$

Substituting these values back into equations for Q, P, S, L1 and L2, the desired conditions, Q=0, P=0, S=0, L1=1/2, and L2=−1/2, are confirmed. If, for example, $R_{11}$=50 (ohms) and $R_{18}$=50 are chosen, then $R_{22}$=50, $R_{14}$=50, $R_{17}$=0, and $R_{20}$=50, R1=33.333 and R2=83.333.

Impedance/resistance values, together with the speed of propagation of the signal, should be empirically determined for the physical embodiments of the circuit, which in one case of the described circuit is constructed with microstrips on conventional FR4 epoxy/glass laminate substrate. TDR (Time Delay Reflectometry) is useful for such experiments.

The speed of propagation determines the lengths of the series and parallel transmission lines 20 and 22 so that the initial pulse at the output terminal 13 is terminated so as to avoid interference with a possible second initial pulse. Hence the series transmission line 20 is long enough so that the reflected pulse (L2 in the equations above) to the output terminal 13 arrives at a time interval equal to the time intervals of the data signals at the input terminal 12. For this embodiment the data rate is 40 gigabits per second set by the OC-768 standard. Furthermore, the length of the parallel transmission line 22 must be matched to that of the series transmission line 20 so that the reflected pulses traveling back to the input terminal 12, the series transmission line 20 and the second transmission line 22 are canceled (the conditions Q=0, S=0 and P=0).

Figure 2:
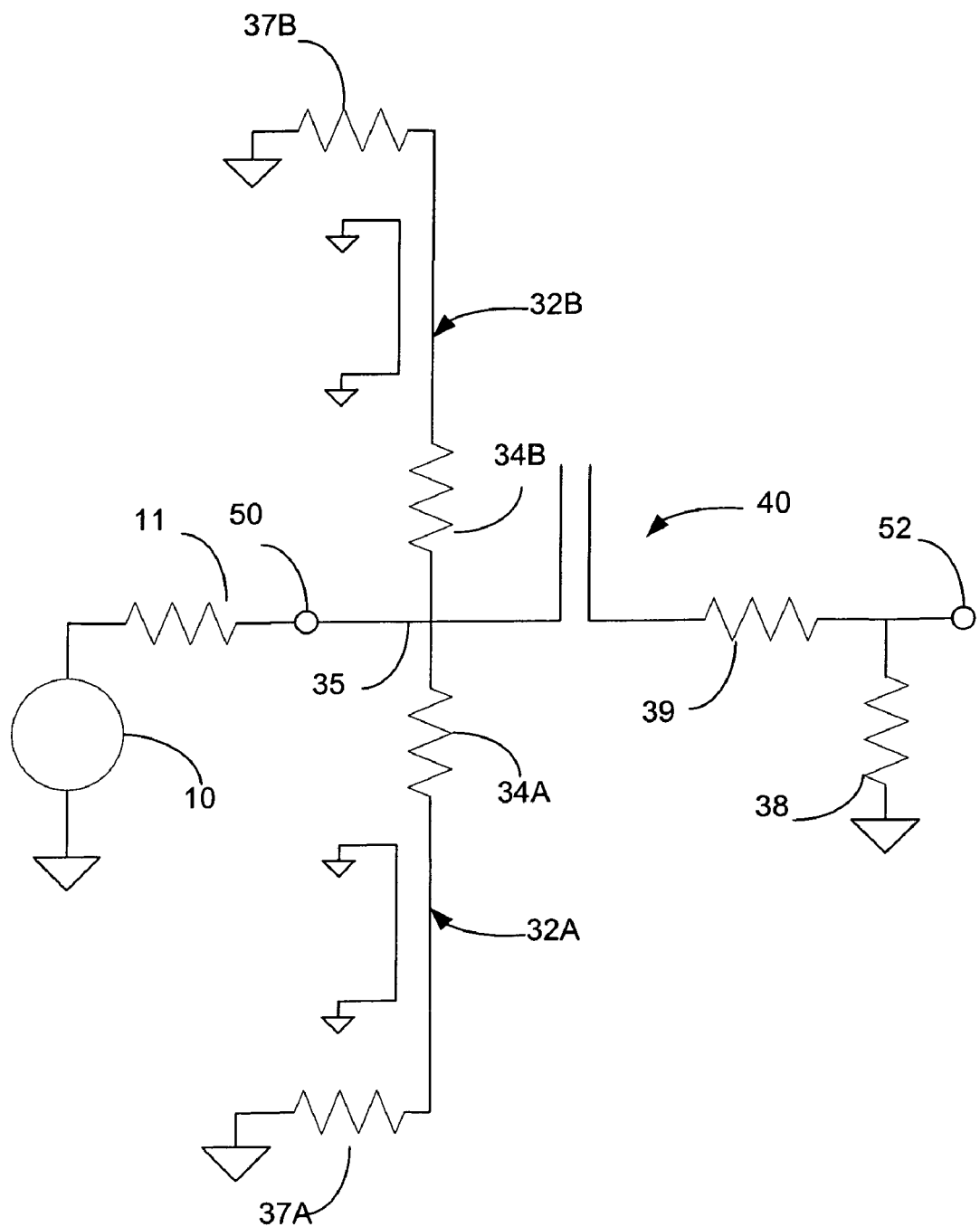
FIG. 2 is a circuit diagram of another embodiment of the present invention.
Figure 3:
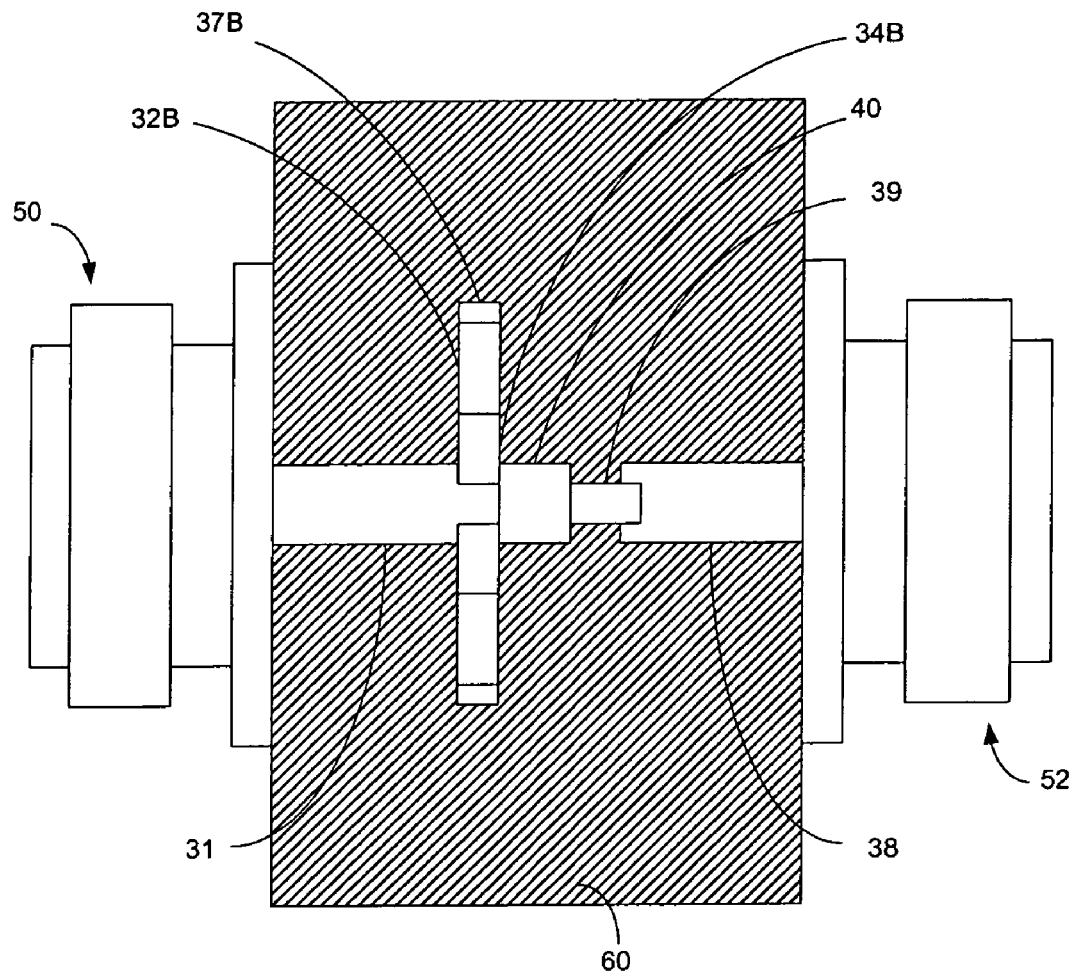
FIG. 3 is a top view of the test circuit layout of a microstrip board of the FIG. 2 circuit.

Another embodiment of an edge detector circuit is the circuit diagram illustrated by FIG. 2 and its physical test layout shown in FIG. 3. The FIG. 2 circuit is very similar to the FIG. 1 circuit. The voltage source 10 and impedance 11 is connected to the input terminal 12 which is the terminus of an input transmission line represented by a node 35. Three other transmission lines 40, 32A and 32B are connected t this node. The transmission line 40 is connected in series to the output terminal 13 through a resistor 39 and to the load represented by a resistor 39. Instead of one parallel transmission line, two parallel transmission lines 32A and 32B are connected in parallel to the node 35 through resistors 34A and 34B respectively. The transmission lines 32A and 32B are terminated to ground through small resistors 37A and 37B respectively.

Besides being useful for testing, the layout of FIG. 3 illustrates how an embodiment of an edge detector circuits of the present invention might be implemented. Many of the reference numerals in FIG. 2 are used in FIG. 3 to identify the physical elements with their diagrammatic counterparts. SMA (SubMiniature version A) connectors 50 and 52 respectively provide connections for a microwave voltage source and for a DCA (Digital Communications Analyzer) to observe the physical layout circuit. Internally the SMAs 50 and 52 are connected to microstrips on an FR4 substrate 60. The resistive input microstrip 11 is connected to the input connector 50 at one end and at the other end becomes the node 35 to which the parallel transmission lines 32A and 32B are connected through resistors 34A and 34B. Terminating resistors 37A and 37B are vertical with respect to the FR4 substrate 60 and reach through the FR4 substrate to a ground plate on the substrate's lower side. Also connected to the node 35 is the series transmission line 40, a stub which extends vertically from the microstrip 31 near its end. Though not shown, the transmission line 40 stub bridges a gap in the microstrip line 31. A small resistive microstrip line 39 connects the floating microstrip line/stub 40 to a resistive line 38 which is connected to the output connector 52.

The resistive line 38 can be considered equivalent to the load resistor of FIG. 2. There is an output load connected to the SMA connector 52. The load should be matched to the SMA connector 52 so that the connector 52 itself appears as the load. The short line between the resistor 39 and the connector 52 should itself be matched to the impedance of the SMA/load, and so in turn appears as the load. The usual impedance choice is 50 ohms. Thus no matter whether one looks into the load, the SMA connector 52, or the short line, 50 ohms is observed. Hence the resistive line 38 is taken as the impedance looking from the resistor 39 into the short line to the SMA connector 52.

For the microstrip circuit to operate as previously described, the parametric resistance values of the circuit elements must be chosen properly. Values (in ohms) for resistance/impedances for the various elements are:

$R_{11}$=50;
$R_{34A}$, $R_{34B}$=80;
$R_{32A}$, $R_{32B}$=20;
$R_{40}$=66;
$R_{39}$=16; and
$R_{38}$=50.

The values of the impedances arise by setting the resistors 34A and 34B to 66 ohms, rather than the 50 ohms of the FIG. 1 circuit. This value allows the width of the vertical line strip 40 to equal to the width of the input microstrip line 31 to reduce stray reflections in the circuit. That width sets $R_{11}$=50 ohms, which requires the other values to be set as indicated above. With respect to speed of propagation parameters, the vertical resisters 37A and 37B in the layout are located 0.075 inches from the centerline of the input microstrip 31 and the height of the floating line stub 40 is 0.078 inches. Theoretically this yields a delay of 2×0.078×158=25 picoseconds, the time interval of a data bit at 40 Gb/s. The value of "158" is a determined value of 158 ps/inch for the reciprocal speed of an electrical signal through the microstrip circuit.

Figure 4:
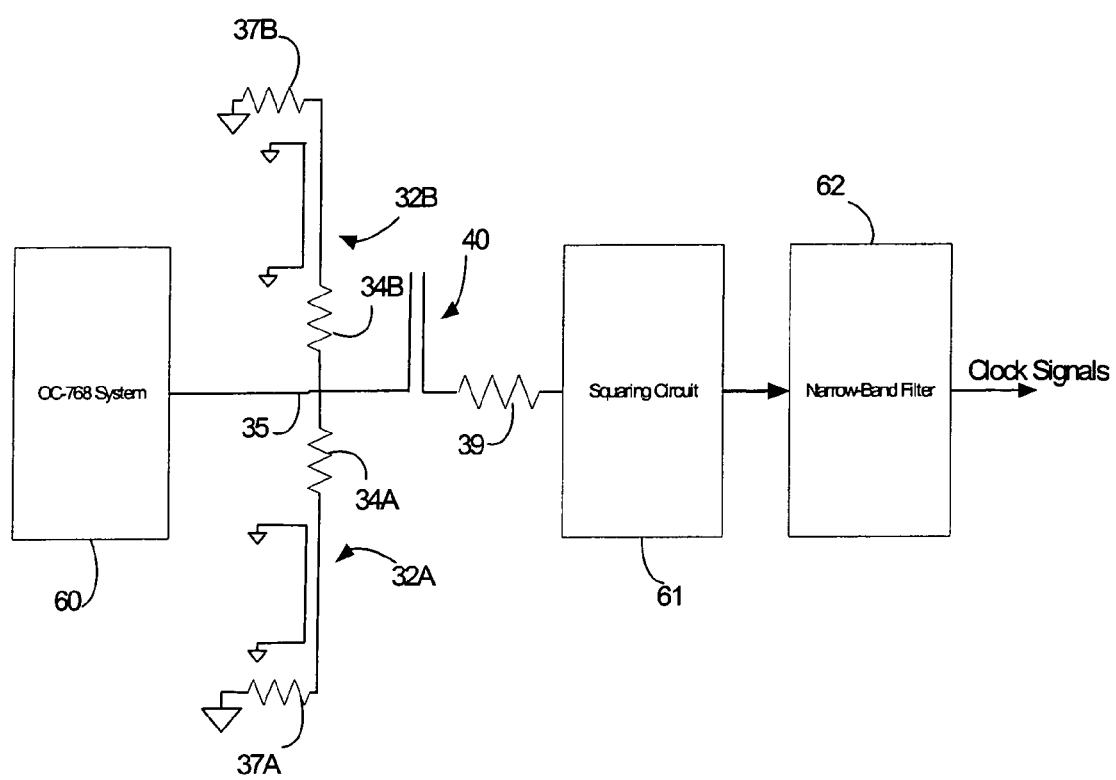
FIG. 4 is a diagram illustrating the connection of an edge detector circuit of the present invention for operation.

Using the edge detector circuit of FIG. 2 as an example, FIG. 4 illustrates how an edge detector circuit of the present invention might be connected in operation. The input terminal of the edge detector circuit is connected to a representative microwave system, a OC-768 system 60, to receive a data stream and the output terminal of the edge detector circuit is connected to a squaring circuit 61 which generates a pulse train at each signal transition. The output of the squaring circuit 61 is fed to a narrow-band filter which processes the pulse train from the squaring circuit 62 into the desired clock signals from the OC-768 data signals. Squaring circuits and narrow-band filter circuits are well-known to electronic circuit designers.

Hence the edge detector of the present invention is well adapted for reducing jitter caused by signals operating at microwave frequencies and is highly suitable for recovering clock signals at OC-768 data rates.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

The invention claimed is:

1. A signal edge detector circuit having an output terminal and an input terminal for receiving microwave signals at a predetermined clock signal rate, said signal edge detector circuit comprising:

an input transmission line connected to said input and output terminals to provide a path for a signal transition from said input terminal to said output terminal, said input transmission line including a node between said input and output terminals;

a first reflection transmission line having first and second ends, said first reflection transmission line connected at a first end to said node providing a reflection of said signal transition, said reflection of a polarity to terminate said signal transition at said output terminal;

at least one second reflection transmission line having first and second ends, said at least one second reflection transmission line connected at a first end to said node providing a reflection of said signal transition, said reflection of a polarity to cancel out said reflection from said first reflection transmission line at said node;

whereby a pulse is generated at said output terminal for each leading signal edge of said microwave signals at said input terminal.

2. The signal edge detector circuit of claim 1 wherein said first reflection transmission line is terminated by an open circuit; and said at least one second reflection transmission line is terminated by a first resistor connected to a reference voltage.

3. The signal edge detector circuit of claim 2 wherein said voltage reference comprises ground.

4. The signal edge detector circuit of claim 1 wherein said at least one second reflection transmission line is connected to said node through a second resistor; and said resistors connected to said at least one second reflection transmission line and resistance/impedances of said input transmission line, said first reflection transmission line and said second reflection transmission line are selected with said input resistance/impedance and said load resistance/impedance so that a signal transition from said input terminal to said output terminal is terminated at said output terminal after a predetermined time interval and reflections of said signal transition back to said input terminal, to said first reflection transmission line and to said at least one second reflection transmission line are canceled.

5. The signal edge detector circuit of claim 4 wherein said resistors connected to said at least one second reflection transmission line and said resistance/impedances of said input transmission line, said first reflection transmission line and said second reflection transmission line are further selected to match an input resistance/impedance at said input terminal and said load resistance/impedance at said output terminal.

6. The signal edge detector circuit of claim 1 wherein said predetermined clock signal rate corresponds to a data stream rate of 40 Mb/sec.

7. The signal edge detector circuit of claim 6 wherein said predetermined clock rate is 20 GHz/s.

8. The signal edge detector circuit of claim 1 further comprising a second reflection transmission line connected in parallel to said at least one second reflection transmission line.

9. A clock signal generator for generating clock signals from a data stream at a predetermined clock rate from a microwave frequency system, said clock signal generator comprising:

a signal edge detector circuit having an output terminal and an input terminal connected to said microwave frequency system for receiving said data stream, said signal edge detector circuit comprising an input transmission line connected to said input and output terminals to provide a path for each signal transition in said data stream from said input terminal to said output terminal, said input transmission line including a node between said input and output terminals;

a first reflection transmission line having first and second ends, said first reflection transmission line connected at a first end to said node providing a reflection of said signal transition, said reflection of a polarity to terminate said signal transition at said output terminal; and at least one second reflection transmission line having first and second ends, said at least one second reflection transmission line connected at a first end to said node providing a reflection of said signal transition, said reflection of a polarity to cancel out said reflection from said first reflection transmission line at said node so that a pulse is generated at said output terminal for each leading signal transition of said data stream at said input terminal;

a squaring circuit connected to said output terminal, said squaring circuit producing a pulse train synchronous with said signal transitions in said data stream; and a narrow-band filter receiving said pulse train to generate said clock signals at said predetermined clock rate.

10. The clock signal generator of claim 9 wherein said microwave frequency system comprises a system which uses an OC-768 standard for signal transmission.

11. The clock signal generator of claim 9 wherein said first reflection transmission line is terminated by an open circuit; and said at least one second reflection transmission line is terminated by a first resistor connected to a reference voltage.

12. The clock signal generator of claim 11 wherein said voltage reference comprises ground.

13. The clock signal generator of claim 9 wherein said at least one second reflection transmission line is connected to said node through a second resistor; and wherein said resistors connected to said at least one second reflection transmission line and resistance/impedances of said input transmission line, said first reflection transmission line and said second reflection transmission line are selected with said input resistance/impedance and said load resistance/impedance so that said signal transition from said input terminal to said output terminal is terminated at said output terminal after a predetermined time interval and reflections of said signal transition back to said input terminal, to said first reflection transmission line and to said at least one second reflection transmission line are canceled.

14. The clock signal generator of claim 13 wherein said resistors connected to said at least one second reflection transmission line and said resistance/impedances of said input transmission line, said first reflection transmission line and said second reflection transmission line are further selected to match an input resistance/impedance of said microwave system at said input terminal and said load resistance/impedance of said squaring circuit at said output terminal.

15. The clock signal generator of claim 9 further comprising a second reflection transmission line connected in parallel to said at least one second reflection transmission line.

16. A signal edge detector circuit having an output terminal and an input terminal for receiving microwave signals at a predetermined clock signal rate, said signal edge detector circuit comprising:

an input transmission line connected to said input and output terminals to provide a path for a signal pulse from said input terminal to said output terminal, said input transmission line including a node between said input and output terminals;

means connected to said node for providing a first reflection of said pulse, said reflection of a polarity to terminate said pulse at said output terminal;

means connected to said node for providing a second reflection of said pulse, said reflection of a polarity to cancel out said reflection from said first reflection transmission line at said node;

whereby a pulse is generated at said output terminal for each leading pulse edge of said microwave signals at said input terminal.

* * * * *